(12) United States Patent
Sabo et al.

(10) Patent No.: US 12,141,065 B2
(45) Date of Patent: Nov. 12, 2024

(54) TECHNIQUES FOR MAINTAINING CACHE COHERENCY

(71) Applicant: Dell Products L.P., Hopkinton, MA (US)

(72) Inventors: Ami Sabo, Netanya (IL); Vladimir Shveidel, Pardes-Hana (IL); Dror Zalstein, Givatayim (IL)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/116,004

(22) Filed: Mar. 1, 2023

(65) Prior Publication Data

US 2024/0296123 A1 Sep. 5, 2024

(51) Int. Cl.
*G06F 12/0815* (2016.01)

(52) U.S. Cl.
CPC ...... *G06F 12/0815* (2013.01); *G06F 2212/45* (2013.01)

(58) Field of Classification Search
None
See application file for complete search history.

(56) References Cited

U.S. PATENT DOCUMENTS

| | | | |
|---|---|---|---|
| 8,396,937 B1 * | 3/2013 | O'Krafka | G06F 13/28 711/146 |
| 11,042,296 B1 * | 6/2021 | Shveidel | G06F 3/0659 |
| 11,366,750 B2 | 6/2022 | Soukhman et al. | |
| 2009/0265352 A1 * | 10/2009 | Holenstein | G06F 16/2336 |
| 2016/0306709 A1 * | 10/2016 | Shaull | G06F 16/219 |
| 2016/0350357 A1 * | 12/2016 | Palmer | G06F 16/273 |
| 2016/0371355 A1 * | 12/2016 | Massari | G06F 16/25 |
| 2020/0349074 A1 * | 11/2020 | Kucherov | G06F 3/0619 |
| 2021/0216531 A1 * | 7/2021 | Shveidel | G06F 16/2365 |
| 2022/0091976 A1 * | 3/2022 | Soukhman | G06F 12/0822 |
| 2022/0350787 A1 * | 11/2022 | Shveidel | G06F 16/2379 |

* cited by examiner

*Primary Examiner* — Kaushikkumar M Patel
(74) *Attorney, Agent, or Firm* — Muirhead and Saturnelli, LLC

(57) ABSTRACT

In at least one embodiment, processing can include determining, by a first node, an update to a metadata (MD) page, wherein the first node includes a first cache; sending, from the first node to a second node, a commit message including the update to the MID page; receiving, at the second node, the commit message from the first node; and storing, by the second node, an updated version of the MID page in a second cache of the second node only if the second cache of the second node includes a cached copy of the MD page, wherein the updated version of the MID page, as stored in the second cache of the second node, is constructed by applying the first update to the cached copy of the first MD page.

18 Claims, 10 Drawing Sheets

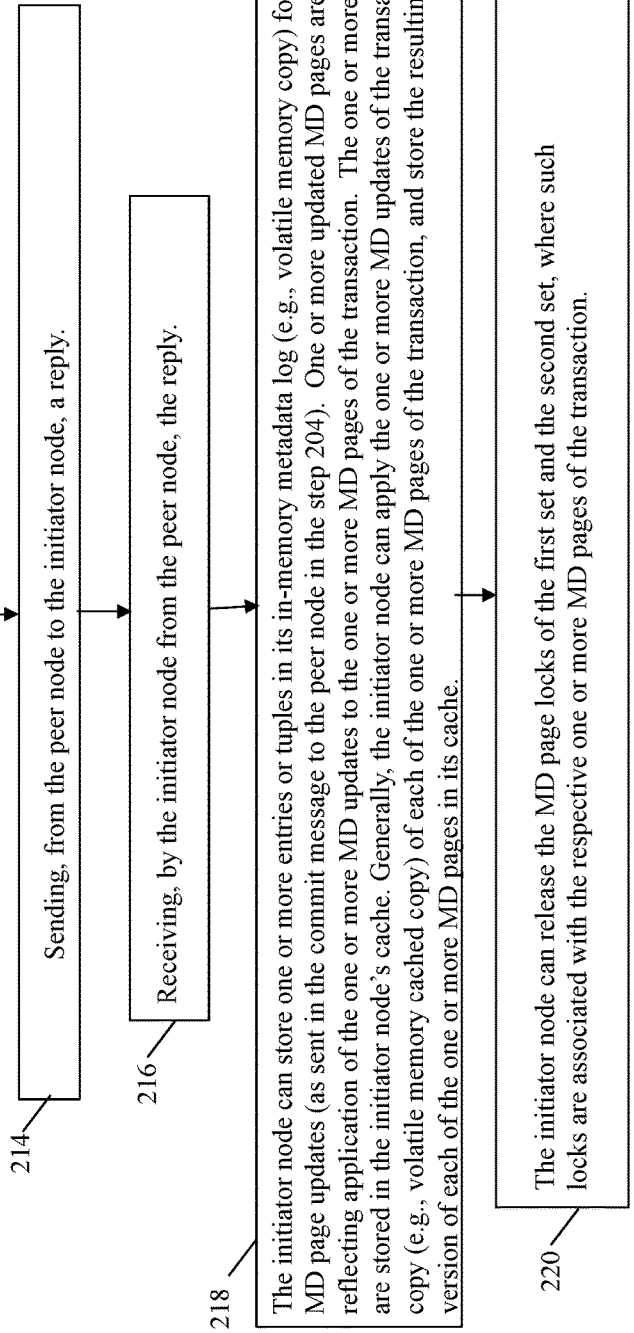

TECHNIQUES FOR MAINTAINING CACHE COHERENCY

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: determining, by a first node, a first update to a first metadata (MD) page, wherein the first node includes a first cache; sending, from the first node to a second node, a commit message including the first update to the first MD page; receiving, at the second node, the commit message from the first node; and storing, by the second node, an updated version of the first MD page in a second cache of the second node only if the second cache of the second node includes an existing cached copy of the first MD page, wherein the updated version of the first MD page, as stored in the second cache of the second node, is constructed by applying the first update to the existing cached copy of the first MD page.

In at least one embodiment, processing can include: determining, by the second node, whether the second cache of the second node includes the existing cached copy of the first MD page; and if the second cache of the second node does not include the existing cached copy of the first MD page, not storing the updated version of the first MD page in the second cache of the second node. Responsive to the second node receiving the commit message from the first node, the second node can persistently store the first update to the first MD page in a persisted MD log on non-volatile storage. Responsive to the second node receiving the commit message from the first node, the second node can store the first update to the first MD page in an in-memory MD log. The in-memory MD log can be local to the second node and used only by the second node.

In at least one embodiment, the step of storing, by the second node, an updated version of the first MD page in a second cache of the second node, can be performed responsive to the second node receiving the commit message from the first node. Processing can include sending a reply to the commit message from the second node to the first node. Responsive to the first node receiving the reply from the second node, the first node can store the first update to the first MD page in an in-memory MD log. The in-memory MD log can be local to the first node and used only by the first node. Responsive to the first node receiving the reply from the second node, the first node can store the updated version of the first MD page in the first cache of the first node. The updated version of the first MD page, as stored in the first cache of the first node, can be constructed by applying the first update to another existing copy of the first MD page stored in the first cache of the first node.

In at least one embodiment, the first node can be an initiator node of a transaction including one or more updates to one or more MD pages. The one or more updates can include the first update, and the one or more MD pages can include the first MD page. The commit message can include the one or more updates. Each of the one or more updates can be specified using a tuple identifying content of one of the one or more MD pages which is modified by said each update. The first node, as the initiator node, can receive a write I/O operation from a host, and wherein the one or more updates to the one or more MD pages can be performed as part of processing to service the write I/O operation. The write I/O operation can write first content to a target logical address of a logical volume, and the one or more MD pages can be included in a sequence of MD pages mapping the target logical address of the logical volume to a storage location of the first content stored at the target logical address. A subset of one or more update types can identify types of MD updates which are not performed on a non-initiator node, and wherein the one or more updates can include a second update to a second MD page, and wherein the second update can have a corresponding MD update type included in the subset. The second node can be the non-initiator node of the transaction, and processing can include: determining, by the second node, that the second cache of the second node includes a copy of the second MD page and that the second update to the second MD page has a corresponding MD update type included in the subset; and responsive to determining that the second cache of the second node includes the copy of the second MD page and that the second update to the second MD page has the corresponding MD update type included in the subset, invalidating or evicting the copy of the second MD page from the second cache of the second node.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 8A, 8B and 9 are flowcharts of processing steps which can be performed in at least one embodiment in accordance with the techniques of the present disclosure.

DETAILED DESCRIPTION OF EMBODIMENT(S)

Figure 1:
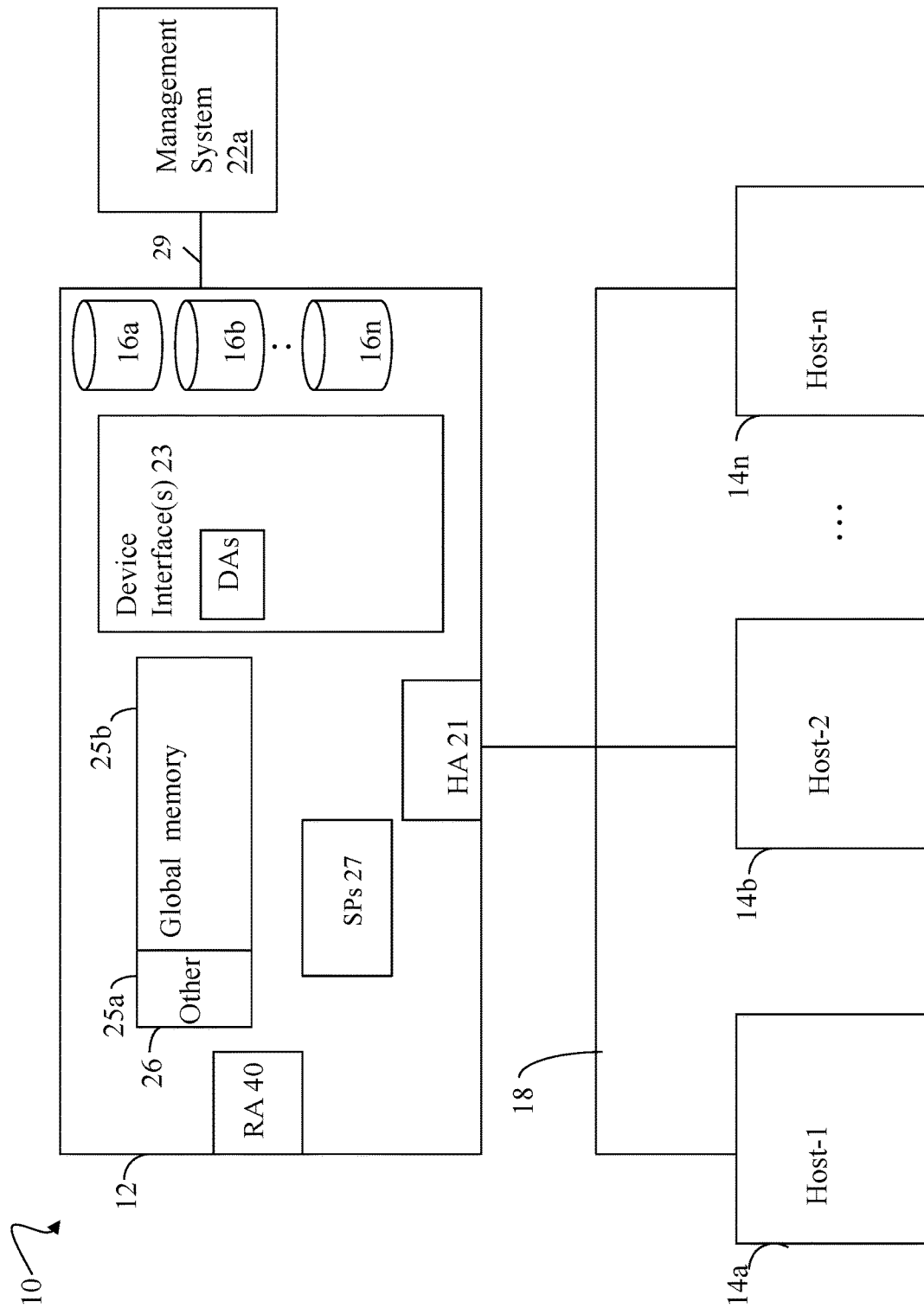
FIG. 1 is an example of components that may be included in a system in accordance with the techniques of the present disclosure.

A data storage system can include multiple nodes which receive and service I/O operations. For example, the data storage system can be a dual node system including two nodes which receive and service I/O operations. The I/O operations can be external with respect to the data storage system and can originate from external storage clients such as hosts connected to the data storage system. The I/O operations can include read and write operations issued with respect to a target location or address of a storage object such as a logical device. Metadata pages can be used to map logical addresses of the logical device to corresponding physical storage locations containing content or data stored at the logical addresses. Thus, the metadata pages can also be modified as operations such as writes are performed to the logical device. Since both nodes in the dual node system can process I/O operations such as write I/O operations, both nodes can modify metadata pages in connection with servicing such I/O operations. Each node can have a node-local volatile memory cache used for caching metadata pages. Thus, both nodes can cache copies of the same metadata page. Different techniques can be used to maintain inter-node cache coherency of such same cached metadata pages on the nodes.

In at least one dual node system including a first node and second node, when an update is made by the first node to a metadata page stored in the first node's cache, the first node can send the updated metadata page to the second node to store in its cache. In some cases, the updated metadata page can be quite large and can undesirably result in increased inter-node traffic. To avoid such increased inter-node traffic, an alternative to sending the updated metadata page from the first node to the second node is to invalidate or evict the metadata page from the second node's cache. The foregoing can be used to maintain cache coherency of metadata with respect to both the first and second nodes and can be used to avoid having to transfer the updated metadata page from the first node to the second node. However, eviction or invalidation of such metadata pages from cache, such as the second node's cache, in connection with the foregoing to maintain cache coherency can result in an increase in the cache miss rate on the second node. Such metadata pages which are invalidated or evicted from cache to maintain cache coherency can be premature or prior to eviction in accordance with a cache management policy such as least recently used (LRU). Put another way, a cache management policy such as LRU can be used to maintain and manage a node's local cache of metadata pages. Absent the update to the metadata page by the first node causing eviction of the metadata page from the second node's cache, the metadata page may have remained in the second node's cache for a longer time period based on the LRU cache management of the second node's cache. Due to the premature or early eviction of the metadata page from the second node's cache, a subsequent request by the second node to read the metadata page can result in a cache miss rather than a cache hit.

In order to overcome the foregoing drawbacks, the techniques of the present disclosure provide for efficiently maintaining metadata cache coherency without sending the entire updated metadata page and without always evicting or invalidating an updated metadata page on a peer node such as the second node described above.

In at least one embodiment using a dual node active-active system where both nodes receive and service I/Os, the system can be optimized such that metadata updates are logged or recorded efficiently by only recording or logging the metadata deltas or changes rather than logging or recording an entire updated metadata page. In at least one embodiment, when the first node updates a metadata page, inter-node cache coherency can be maintained without automatically evicting or invalidating the updated metadata page on the second node. In at least one embodiment, the techniques of the present disclosure provide for sending the metadata changes or updates to the metadata page (rather than send a completed updated metadata page) from the first node to the second node.

The techniques of the present disclosure provide for conditionally and selectively updating the second node's cache. In at least one embodiment, the metadata updates can be made, to an existing cached copy of the metadata page stored in the second node's cache, during processing to commit the metadata updates to a metadata log. The metadata update to the metadata page can be one of multiple metadata updates made as part of a transactional update generally to one or more metadata pages. In at least one embodiment, responsive to the first node updating the metadata page and sending the metadata updates to the second node, processing can include determining if there is an existing cached copy of the metadata page in the second node's cache. If there is an existing cached copy of the metadata page being updated during commit processing in the second node's cache, the existing cached copy of the second node's cache is updated by applying the metadata page updates as sent from the first node to the second node. If there is no existing cached copy of the metadata page in the second node's cache, there is no processing performed to update the second node's cache (e.g., there is no metadata page update applied to the second node's cache). Thus, in at least one embodiment, the techniques of the present disclosure provide for storing the updated metadata page in the second node's cache only if the second node's cache already includes an existing cached copy of the metadata page now being updated during commit processing. Responsive to the second node's cache not containing the existing cached copy of the metadata page, there is no cache update to the second node's cache. In this manner, the techniques of the present disclosure provide for selectively updating the second node's cache only if the second node's cache already includes the existing cached copy of the metadata page, whereby applying the metadata updates sent from the first node to the second node results in obtaining an up to date copy of the metadata page as also stored in the first node's cache.

Thus, the techniques of the present disclosure provide for an increase in cache hits with respect to both nodes in such a dual node active-active system. In at least one embodiment where a metadata page is updated by the first node and where the second node's cache includes the existing cached copy of the same metadata page which is updated by the first node, caches of both the first node and the second node are updated to include the updated version of the same metadata page. Subsequent requests on both the first node and the second node to read the same metadata page now result in cache hits.

The foregoing and other aspects of the techniques of the present disclosure are described in more detail in the following paragraphs.

Referring to the FIG. 1, shown is an example of an embodiment of a SAN10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, ISCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), to modify an existing replication schedule or configuration (e.g., which result in updating existing information in one or more database tables for the current replication schedule or configuration), to delete a LUN (e.g., which include deleting the LUN from a table of defined LUNs and also include modifying one or more other database tables to delete any existing snapshots of the LUN being deleted), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like.

Consistent with other discussion herein, management commands result in processing that can include reading and/or modifying information in the database storing data storage system configuration information. For example, management commands that read and/or modify the data storage system configuration information in the database can be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

An embodiment of a data storage system in accordance with techniques herein can perform different data processing operations or services on user data stored on the data storage system. For example, in at least one embodiment in accordance with the techniques herein, a data storage system can provide different data replication technologies, facilities or services. Such replication technologies may be characterized as local or remote. Additionally, a replication technology can provide for creating a complete, physical bit for bit copy of data (that is local and/or remote). A replication technology can provide for creating a logical or virtual point in time copy of a data source such as using a snapshot technology or facility known in the art. Such logical copies of a data source are not a complete physical copy of the data source. Rather, different techniques such as a snapshot technique can be used to create a logical or virtual copy of the data source. For example, a snapshot facility may be used in an embodiment in accordance with techniques herein to create a snapshot characterized as a logical point in time copy of data such as of a LUN or other storage object or entity. In connection with a logical device, or more generally any storage object or entity, software of a data storage system can provide one or more data replication services or facilities whereby a snapshot is one such facility that can be used to create point in time snapshot of a logical device such as a LUN for non-disruptive backup. A snapshot can appear like a normal logical device and can be used for backup, testing, and the like. In at least one embodiment, I/O operations such as read and write can be issued to a snapshot such as of a LUN. In at least one embodiment, the snapshot facility may be characterized as a local replication facility or service that takes snapshots of storage objects in a single data storage system. A local replication facility can be contrasted with a remote replication facility that provides for remote replication of storage objects from a source site or data storage system to a remote site or data storage system. Remote replication facilities provide remote copies of the storage objects for use in connection with data unavailability or disaster of the source site.

Snapshots of a source logical device or LUN can rely, for example, on copy on first write (COFW) and other techniques to track source logical device changes from the time when a snapshot was created. Any writes to the source logical device can result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device can be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device can be contrasted, for example, with the physically complete bit-for-bit replicas of the source logical device.

In connection with the foregoing, COFW is only one example of a technology or a technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary or source logical device are redirected (written) to a new location.

Figure 2:
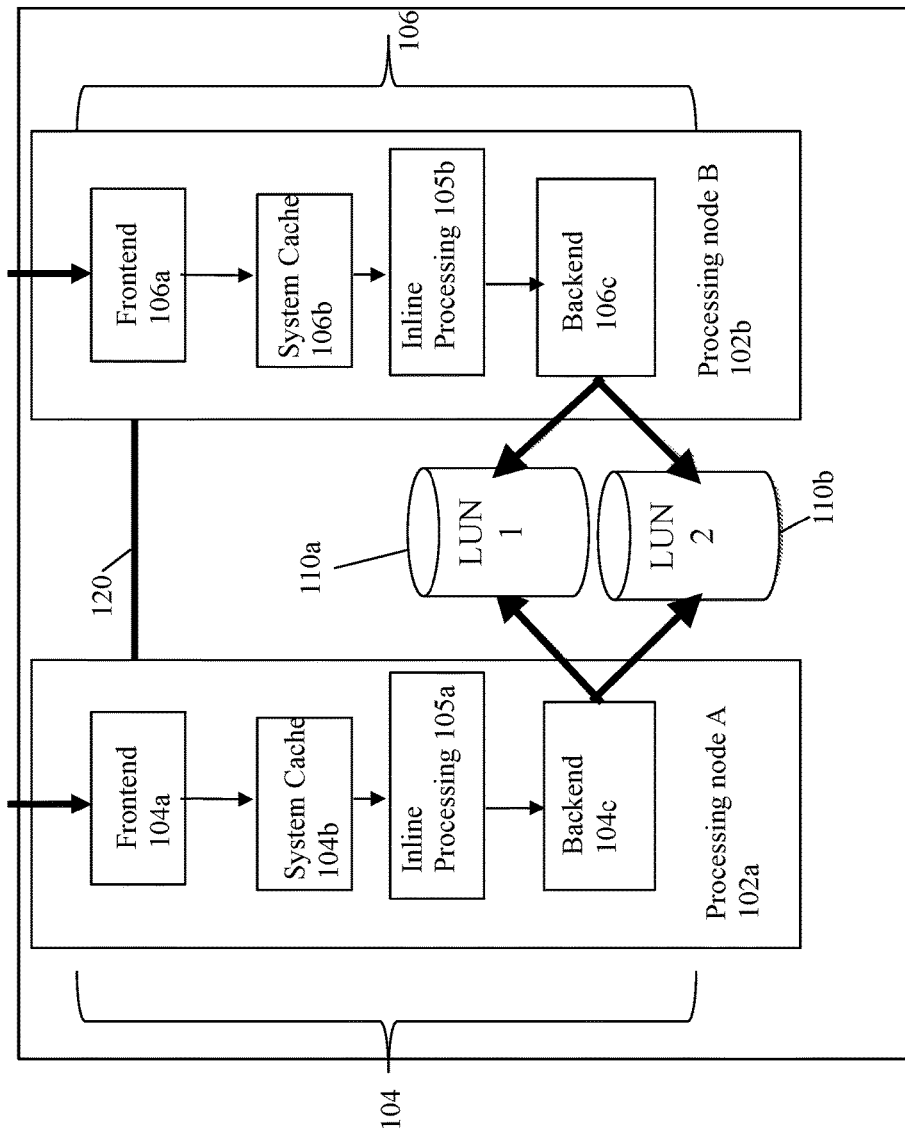
FIG. 2 is an example illustrating the I/O path or data path in connection with processing data in at least one embodiment in accordance with the techniques of the present disclosure.

With reference to the FIG. 2, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2, for write operations, latency can be affected by the amount of time taken to store the write data in the log where the write data is visible to both nodes or controllers of the system.

Consistent with other discussion herein, the log file can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
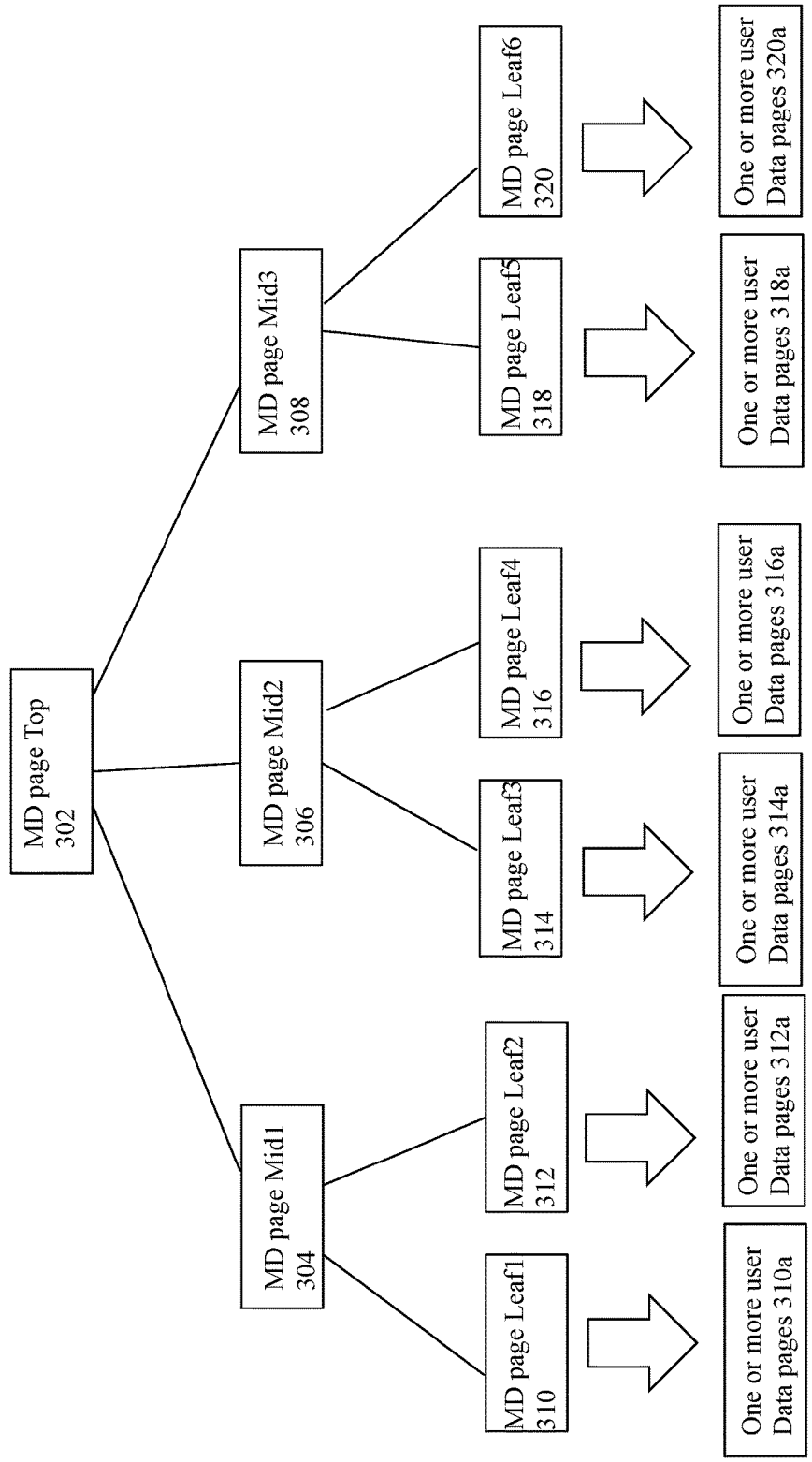
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

In at least one embodiment, the mapping structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Referring to FIG. 3, shown is an example 300 of a tree of MD pages that can be used in an embodiment in accordance with the techniques herein. The example 300 includes a tree of MD pages denoting the mapping structure as discussed above with 3 levels-a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312*a*. In order to access UD page X of 312*a*, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310*a*, 312*a*, 314*a*, 316*a*, 318*a* and 320*a* include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310*a*, 312*a*, 314*a*, 316*a*, 318*a* and 320 each include user data stored on particular logical addresses of the LUN A's logical address space. It may be, for example, that element 310*a* includes user data stored at a first set of LBAs 0-511; and that element 312*a* includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310*a* denotes data pages for LBAs 0-511; the element 312*a* denotes data pages for the LBAs 512-1023; the element 314*a* denotes data pages for LBAs 1024-1535; the element 316*a* denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310*a* denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310*a*.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
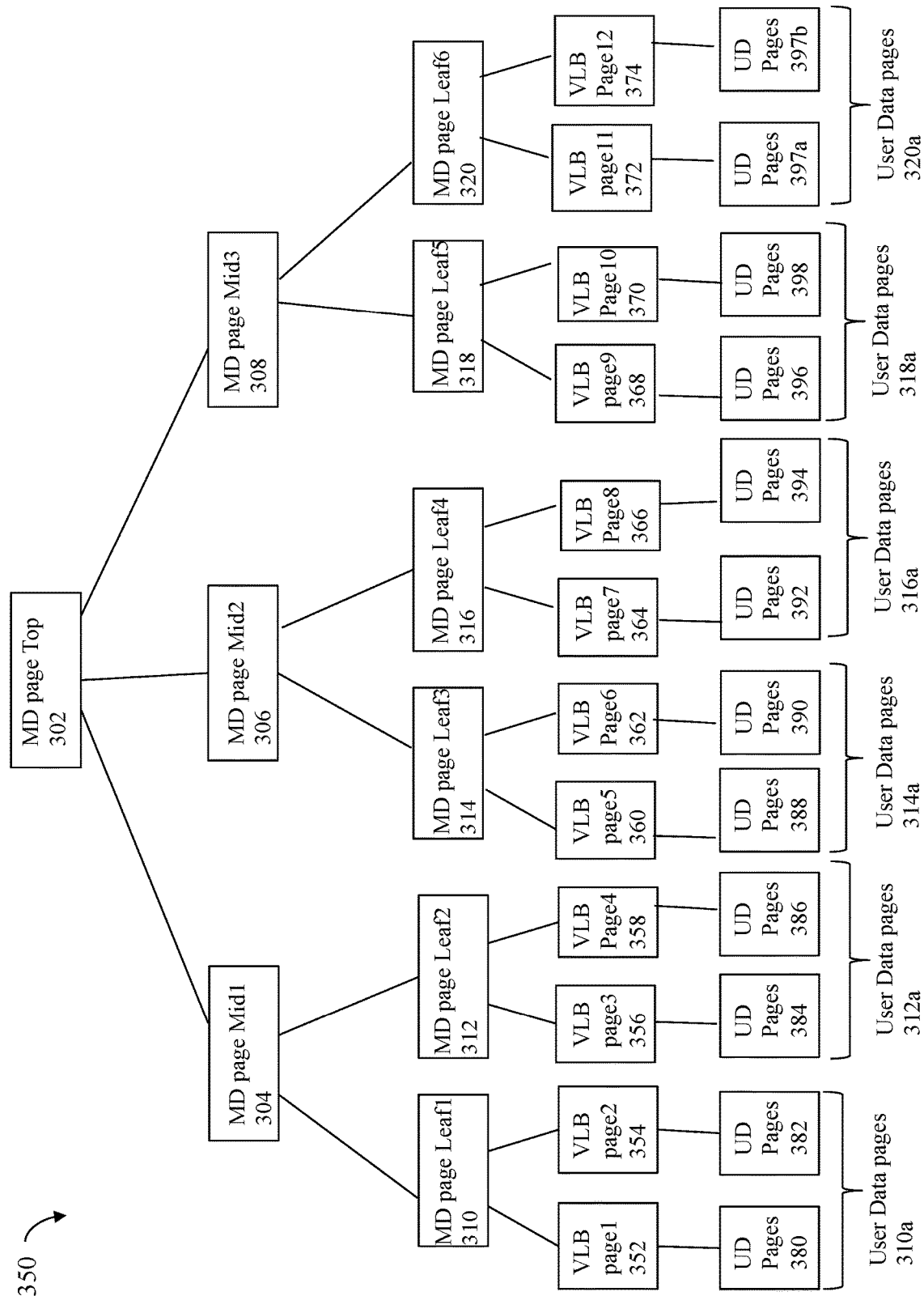

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages-MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
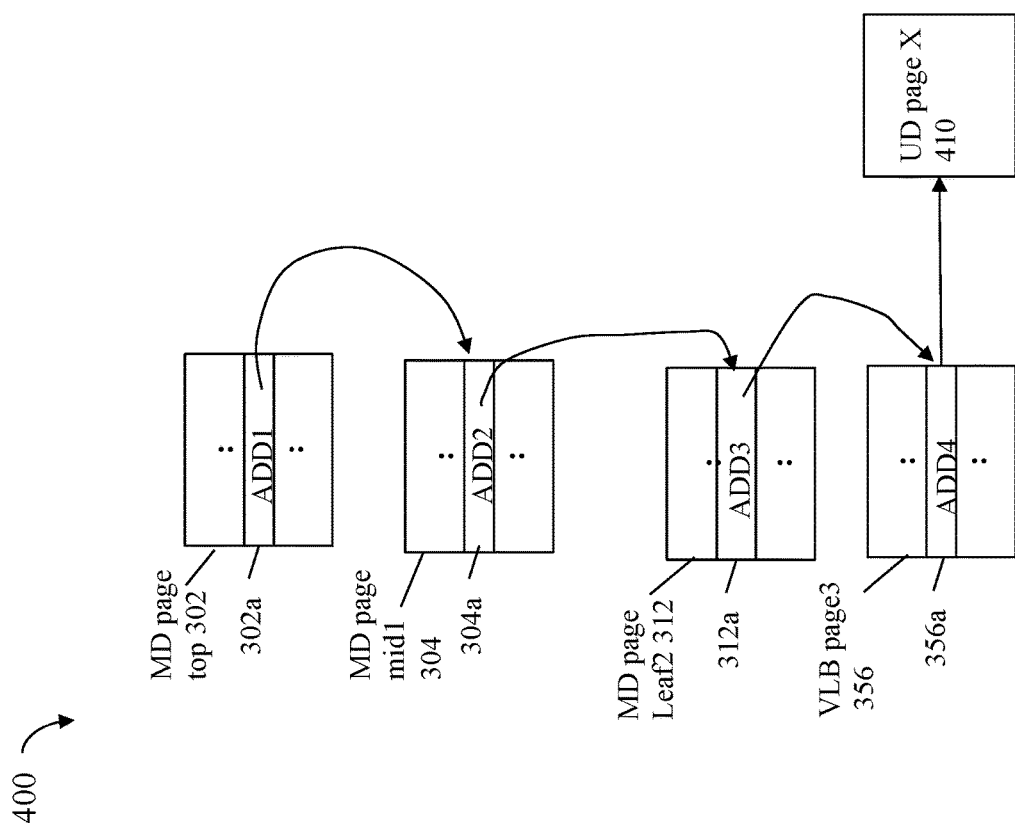

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the location 304a in the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the entry 304a of the particular mid level MD page, such as MD page mid1 304, that is accessed next in the sequence.

Continuing with the example 400, the MD page mid1 304 can be accessed where the location 304a is read to obtain the address or pointer ADD2 from location 304a. The address or pointer ADD2 can then be used to identify the entry 312a of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies location 312a of the MD page leaf 2 312. If the MD page 312 is not already in cache, the on-disk copy of the MD page 312 on a PD can be read to obtain the content of location 312a. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
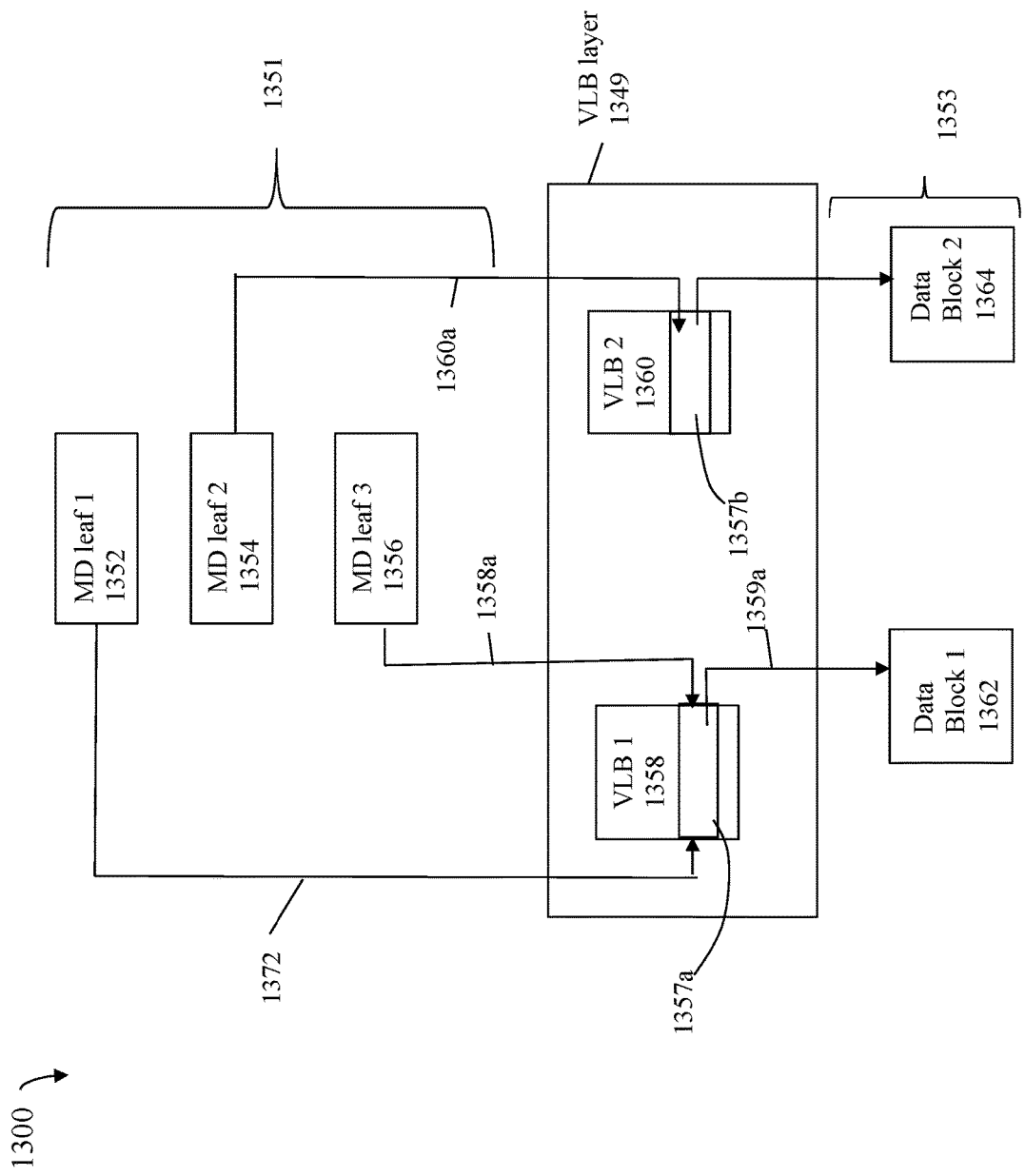

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include a pointer to, or address of, the user data block 1362.

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357*a* of the VLB structure 1358, where the entry 1357*a* can further include a pointer to, or address of, the user data block 1362.

The element 1360*a* denotes a pointer to, or address of, the entry 1357*b* in the VLB 1360 used in connection with obtaining the data block 1364 stored on a particular LUN and LBA of the LUN. The pointer 1360*a* can be used as the virtual or indirect pointer in connection with obtaining the data block 1364. Thus, in such an embodiment, the virtual or indirect pointer 1360*a* can be a pointer to the entry 1357*b* of the VLB structure 1360, where the entry 1357*b* can further include a pointer to, or address of, the user data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6. In at least one embodiment, the MD or mapping information used in connection with stored user data can y be stored on non-volatile storage, such as on the BE PDs of the appliance or data storage system. At least some of the MD or mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at physical storage locations on the BE PDs. Additionally, the MD or mapping information corresponding to the logged writes being flushed can also be accordingly updated to reference the physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the MD or mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing, a metadata log architecture can be used which includes a metadata log where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 3-6).

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer counter can indicate that the size of V is the size of an integer, such as 32 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

Figure 7:
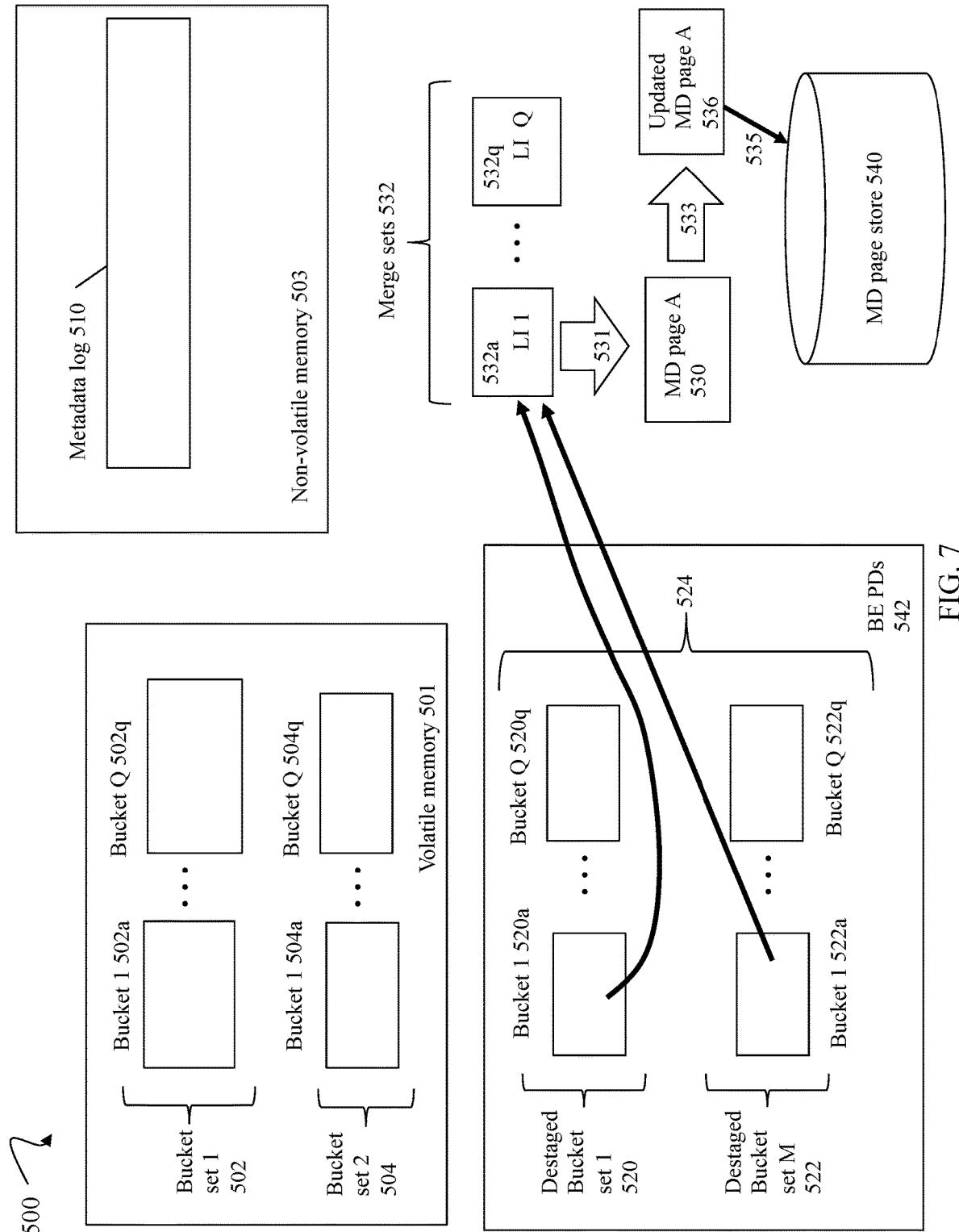
FIG. 7 is an example illustrating structures and associated data flow in at least one embodiment in accordance with the techniques of the present disclosure.

Referring to FIG. 7, shown is an example 500 illustrating structures and associated data flow in at least one embodiment in accordance with the techniques of the present disclosure.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page.

The volatile memory 501 of each node can include volatile memory structures 502, 504. In at least one embodiment, the structures 502, 504 can denote two bucket sets 502, 504 where at any point in time, one of the two buckets sets 502, 504 can be designated as the active set and the remaining bucket set can be designated as the destaging or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets implemented as an array, where the hash value HVI of the LI of a MD page denotes the index of the array and the bucket associated with the MD page. Within each bucket associated with a MD page, the metadata updates can be sorted in a time order, from oldest to newest, based on when the metadata updates are received in the system. In at least one embodiment, each bucket (e.g., 502a) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update U1 is made to a MD page, the metadata update U1 can be represented as a tuple. The metadata update U1 can be inserted into the active bucket set as follows. The hash function H is used to calculate a hash value HV of the LI of the MD page (e.g., H(LI)=HV). The HV can denote the bucket uniquely associated with the MD page being updated. For example, assume the bucket set 502 is the active set and assume that the MD page A is being updated with the new metadata update U1. The MD page A can have an LI that generates a hash value=1 mapping to the first bucket, bucket 1 502a, of the bucket set 502. The bucket 502a can be a binary tree including metadata updates to the MD page A. The metadata update U1 can be inserted into the sorted binary tree of 502a based, at least in part, on when the metadata change U1 was received.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two bucket sets 502, 504 of a node at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in any suitable structures and organization. For example, each destaged bucket set of metadata updates for MD pages can be organized into buckets of bucket pages, where each bucket can correspond or map uniquely to a single MD page. For example, the bucket 1 520a of the destaged bucket set 1 520 can include metadata updates for the MD page A as noted above. The bucket (e.g., 520a) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520a, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520a, 522a) in each of the M destaged bucket sets of 524. The second phase of destaging can aggregate and combine the metadata updates for the MD page A 530 from the first buckets (e.g., 520a, 522a) across the multiple M destaged sets 524 of metadata updates as stored on the BE PDs 542 in the first phase of destaging. The element 532a can denote the merge set of aggregated updates from the first buckets 520a, 522a of the destaged sets 524 for the MD page A 530. Thus the merge set or working set 532a of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532a of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532a-q based on the LI of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art. A ring buffer can be represented as a logical ring of records or entries. The ring buffer can be maintained using pointers, such as a head pointer and a tail pointer, where new entries of the ring can always be allocated from the head and space reclamation can always be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542.

Consistent with discussion above, a data storage system can include multiple nodes which receive and service I/O operations. For example, the data storage system can be a dual node, active-active system including two nodes which receive and service I/O operations. The I/O operations can be external with respect to the data storage system and can originate from external storage clients such as hosts connected to the data storage system. The I/O operations can include read and write operations issued with respect to a target location or address of a storage object such as a logical device. Metadata pages can be used to map logical addresses of the logical device to corresponding physical storage locations containing content or data stored at the logical addresses. Thus, the metadata pages can also be modified as operations such as writes are performed to the logical device. Since both nodes in the dual node system can process I/O operations such as write I/O operations, both nodes can modify metadata pages in connection with servicing such I/O operations. Each node can have a node-local volatile memory cache used for caching metadata pages. Thus, both nodes can cache copies of the same metadata page. Different techniques can be used to maintain inter-node cache coherency of such same cached metadata pages on the nodes.

In at least one dual node system including a first node and second node, when an update is made by the first node to a metadata page stored in the first node's cache, the first node can send the updated metadata page to the second node to store in its cache. In some cases, the updated metadata page can be quite large and can undesirably result in increased inter-node traffic. To avoid such increased inter-node traffic, an alternative to sending the updated metadata page from the first node to the second node is to invalidate or evict the metadata page from the second node's cache. The foregoing can be used to maintain cache coherency of metadata with respect to both the first and second nodes and can be used to avoid having to transfer the updated metadata page from the first node to the second node. However, eviction or invalidation of such metadata pages from cache, such as the second node's cache, in connection with the foregoing to maintain cache coherency can result in an increase in the cache miss rate on the second node. Such metadata pages which are invalidated or evicted from cache to maintain cache coherency can be premature or prior to eviction in accordance with a cache management policy such as least recently used (LRU). Put another way, a cache management policy such as LRU can be used to maintain and manage a node's local cache of metadata pages. Absent the update to the metadata page by the first node causing eviction of the metadata page from the second node's cache, the metadata page may have remained in the second node's cache for a longer time period based on the LRU cache management of the second node's cache. Due to the premature or early eviction of the metadata page from the second node's cache, a subsequent request by the second node to read the metadata page can result in a cache miss rather than a cache hit.

In order to overcome the foregoing drawbacks, the techniques of the present disclosure provide for efficiently maintaining metadata cache coherency without sending the entire updated metadata page and without always evicting or invalidating an updated metadata page on a peer node such as the second node described above.

In at least one embodiment using a dual node active-active system where both nodes receive and service I/Os, the system can be optimized such that metadata updates are logged or recorded efficiently by only recording or logging the metadata deltas or changes rather than logging or recording an entire updated metadata page. In at least one embodiment, when the first node updates a metadata page, inter-node cache coherency can be maintained without automatically evicting or invalidating the updated metadata page on the second node. In at least one embodiment, the techniques of the present disclosure provide for sending the metadata changes or updates to the metadata page (rather than send a completed updated metadata page) from the first node to the second node.

The techniques of the present disclosure provide for conditionally and selectively updating the second node's cache. In at least one embodiment, the metadata updates can be made, to an existing cached copy of the metadata page stored in the second node's cache, during processing to commit the metadata updates to a metadata log. The metadata update to the metadata page can be one of multiple metadata updates made as part of a transactional update generally to one or more metadata pages. In at least one embodiment, responsive to the first node updating the metadata page and sending the metadata updates to the second node, processing can include determining if there is an existing cached copy of the metadata page in the second node's cache. If there is an existing cached copy of the metadata page being updated during commit processing in the second node's cache, the existing cached copy of the second node's cache is updated by applying the metadata page updates as sent from the first node to the second node. If there is no existing cached copy of the metadata page in the second node's cache, there is no processing performed to update the second node's cache (e.g., there is no metadata page update applied to the second node's cache). Thus, in at least one embodiment, the techniques of the present disclosure provide for storing the updated metadata page in the second node's cache only if the second node's cache already includes an existing cached copy of the metadata page now being updated during commit processing. Responsive to the second node's cache not containing the existing cached copy of the metadata page, there is no cache update to the second node's cache. In this manner, the techniques of the present disclosure provide for selectively updating the second node's cache only if the second node's cache already includes the existing cached copy of the metadata page, whereby applying the metadata updates sent from the first node to the second node results in obtaining an up to date copy of the metadata page as also stored in the first node's cache.

Thus, the techniques of the present disclosure provide for an increase in cache hits with respect to both nodes in such a dual node active-active system. In at least one embodiment where a metadata page is updated by the first node and where the second node's cache includes the existing cached copy of the same metadata page which is updated by the first node, caches of both the first node and the second node are updated to include the updated version of the same metadata page. Subsequent requests on both the first node and the second node to read the same metadata page now result in cache hits.

The foregoing and other aspects of the techniques of the present disclosure are described in more detail in the following paragraphs.

What will now be described is processing that can be performed in connection with two nodes of the dual node appliance to synchronize access and perform commit processing for a transactional update to one or more MD pages involved in a transaction. Additionally, as part of the commit processing, processing can be performed to maintain MD cache coherency between the two nodes. In the context of examples described in the following paragraphs, updates to all of the one or more MD pages can be required for the transaction initiated by an initiator node. The metadata updates to the one or more MD pages can be performed, for example, in connection with processing a write I/O received by the initiator node which is initiating the transaction of metadata updates applied to the one or more MD pages.

In connection with discussion in the following paragraphs, an initiator node (sometimes simply referred to as an initiator) can refer to the node which receives an I/O operation or request, such as a write I/O operation, and more generally, initiates the transaction to update one or more MD pages. The remaining node can be referred to as a peer node or non-initiating node (sometimes simply referred to as a peer or non-initiator with respect to the transaction).

In at least one embodiment with a dual node, or more generally, multi-node system, each node can maintain a separate node-local volatile memory cache used to cache various desired data. In connection with embodiments described in the following paragraphs and consistent with other discussion herein, each node-local volatile memory cache (which is local to a particular node) can be used to cache complete MD pages for use only by the particular node. Such cached copies of MD pages (stored in the node's volatile memory cache) can be used by the particular node in connection with servicing requests to read MD pages on the node. If a requested MD page is in the node's cache, a cache hit (e.g., read MD page cache hit) results, where the read request for the MD page can be serviced by returning the cached copy of the MD page. If a requested MD page is not in the node's cache, a cache miss (e.g., read MD page cache miss) on the node results. Responsive to the read MD page cache miss, the node can perform processing to construct an up to date MD page. In an embodiment using the MD log architecture such as described in connection with FIG. 7, processing to construct the up to date MD page can include: retrieving the most recent persistently stored version of the MD page from the MD page store; applying any metadata updates or deltas (which have been received but not yet applied) to the most recent persistently stored version of the MD page to generate the up to date MD page; and returning the up to date MD page in response to the read request for the MD page.

Constructing the up to date current version of the MD page C1, where C1 can denote the LI of the current MD page, can include reading a stored version of the MD page from the MD page store of the BE PDs, and applying any metadata updates or changes received but not yet applied to the MD page. The metadata updates for the MD page can be aggregated from the in-memory or volatile memory structures of the node's volatile memory 501 (e.g., the in-memory metadata log from the bucket sets 502, 504 of the volatile memory 501 of the nodes) and also from the BE PDs 542. In particular, the metadata updates for the MD page can be aggregated and merged from the bucket sets 502 and 504 (e.g., the node's in-memory metadata log), and also from the destaged bucket sets 524. The metadata updates for the particular MD page can be retrieved based on the LI uniquely associated with the MD page, where the LI is mapped uniquely to a particular bucket in each of the bucket sets 502, 504, and each of the bucket sets of 524. Consistent with other discussion herein, the metadata updates for the MD page can be aggregated and merged. A stored version of the MD page can be retrieved from the MD page store 540, and the merged metadata updates from the MD page can then be applied to the stored version of the MD page to thereby obtain the latest up to date version of the MD page.

In at least one embodiment in accordance with the techniques of the present disclosure, the initiator node can always store the resulting updated MD page in its cache. The updated MD page can be the updated current version of the MD page as a result of applying a MD update of the transaction initiated or originated by the initiator node.

Figure 8A:
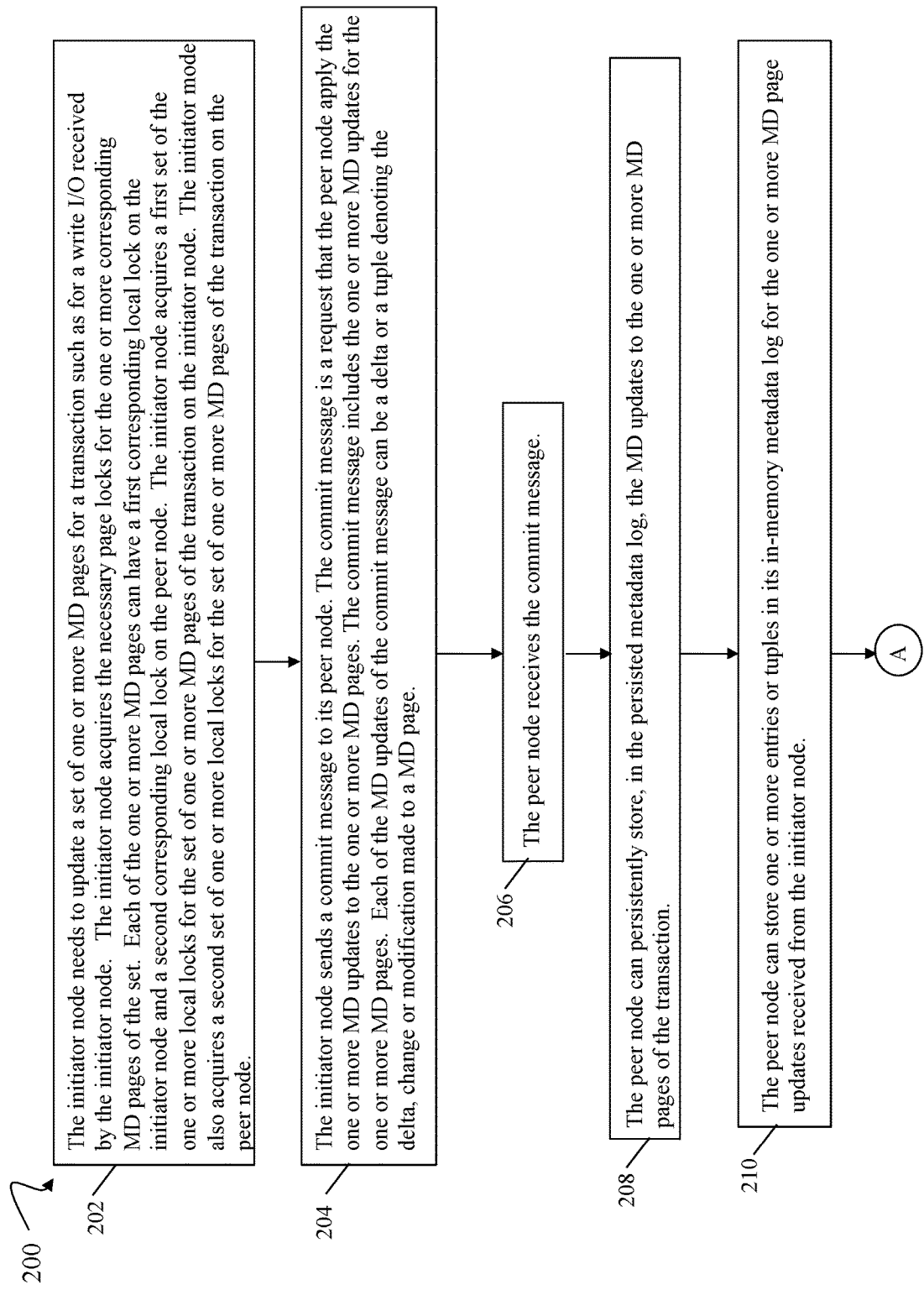

Referring to FIGS. 8A and 8B, shown is a flowchart 200, 250 of processing steps that can be performed in at least one embodiment in accordance with the techniques of the present disclosure.

Generally, the processing of FIGS. 8A and 8B can be performed as part of commit processing to commit a transaction of one or more MD updates to one or more MD pages. In at least one embodiment, the processing of the commit can be characterized as commencing with the step 204 under the assumption that commit processing does not begin until the initiator node has acquired the necessary MD page locks.

In a step 202, the initiator node needs to update a set of one or more MD pages for a transaction such as for a write I/O received by the initiator node. The initiator node acquires the necessary page locks for the one or more corresponding MD pages of the set. Generally, the page locks acquired by the initiator node for the MD pages to be updated provide the initiator node with exclusive access to the MD pages in order to update the MD pages. Each of the one or more MD pages can have a first corresponding local lock on the initiator node and a second corresponding local lock on the peer node. The initiator node acquires a first set of the one or more local locks for the set of one or more MD pages of the transaction on the initiator node. The initiator mode also acquires a second set of one or more local locks for the set of one or more MD pages of the transaction on the peer node. From the step 202, control proceeds to a step 204.

At the step 204, the initiator node sends a commit message to its peer node. The commit message is a request that the peer node apply the one or more MD updates to the one or more MD pages. The commit message includes the one or more MD updates for the one or more MD pages. Each of the MD updates of the commit message can be a delta or a tuple denoting the delta, change or modification made to a MD page. From the step 204, control proceeds to the step 206.

At the step 206, the peer node receives the commit message. From the step 206, control proceeds to the step 208.

At the step 208, the peer node can persistently store, in the persisted or non-volatile metadata log, the MD updates to the one or more MD pages of the transaction. From the step 208, control proceeds to the step 210.

At the step 210, the peer node can store one or more entries or tuples in its in-memory metadata log for the one or more MD page updates received from the initiator node. The updates are those included in the commit message sent in the step 204 from the initiator node. From the step 210, control proceeds to the step 212.

At the step 212, the peer node can store and apply the one or more MD updates to its node-local cached copy (e.g., node local volatile memory cached copy), if any, of each of the one or more MD pages of the transaction. For a MD page M1 updated by one of the MD updates U1, processing can be performed to determine if the peer node's cache includes an existing copy of M1 (e.g., the existing version of M1 as prior to updating with U1). If the peer node's cache does not currently store an existing copy of MD page M1 being updated by U1, no processing is performed with respect to updating the peer node's cache. In other words, if the peer node's cache does not include an existing copy of M1, no update is made to the peer node's cache such that the peer node's cache will not include a cached copy of M1 after commit processing for the transaction is complete. Alternatively, if the peer node's cache does include the existing copy of M1, the peer node's cache is updated. The update U1 is applied to the existing copy of M1 from the peer node's cache to construct an updated current version of the MD page M1, where the updated current version of the MD page M1 is stored in the peer node's cache. Put another way, for MD update U1 for MD page M1, if MD page M1 is not in the peer node's cache, no processing is performed with respect to the peer node's cache, U1, and M1. Otherwise, if MD page M1 is in the peer node's cache apply U1 to M1 and store the resulting updated version of M1 in the peer node's cache.

Additionally, in at least one embodiment, the step 212 can include the peer node conditionally and selectively invalidating or evicting an existing MD page in its cache if the update to be applied to the MD page is included in a predefined subset of one or more update or delta types. In at least one embodiment where the MD updates are tuples as described elsewhere herein, each tuple can include a T field denoting the type of metadata update. The predefined subset can include one or more MD update types which are characterized as complex MD updates deemed too complex to be applied to the peer node's cache during commit processing. The complex MD update having a type T in the predefined subset can selectively not be applied to an existing cached MD page of the peer node's cache such as due to the amount of resources and time expected to be incurred to apply the complex MD update to the cached MD page of the peer node's cache. To further illustrate, consider a MD update U2 of type T2 to be applied to an existing copy of the MD page M2 stored in the peer node's cache, where T2 is included in the predefined subset. Rather than apply U2 of type T2 to its existing cached copy of M2, the peer node can selectively invalidate or evict MD page M2 from its cache based, at least in part, on T2 (the MD update type of update U2) being included in the predefined subset.

In at least one embodiment, the predefined subset can include a first tuple type generally denoting a complex MD update type such as T2 discussed above.

In at least one embodiment, the predefined subset can include a second tuple type T3 denoting a dependent MD page update. To further illustrate, a MD update U3 can be an update to MD page X which depends on another MD page Y. For example, U3 can apply an update to MD page X, where U3 references or uses content from the MD page Y. Thus, to apply U3 to MD page X requires having an up to date copy of the MD page Y. In such an embodiment, any MD page update to be applied to MD page X, where the update depends on, or references, content of another MD page Y, may not be applied to the peer node's cached copy of MD page X. In at least one embodiment, rather than apply the update U3 to the existing cached copy of MD page X stored in the peer node's cache, the existing cached copy of MD page X in the peer node's cache can be invalidated or evicted.

In at least one embodiment, one example of a MD update which is tuple of type T3 noted above can be used in connection with performing a MD page split operation with respect to an existing MD page. In at least one embodiment, the MD page split operation can be performed, for example, in connection with a snapshot of a base storage object such as a source LUN or volume. For example, a snapshot of a LUN can include the same data as the source LUN. Subsequently, there can be writes to the source LUN. However, the snapshot can still include the same content of the source LUN as prior to the writes. As a result of the writes to the source LUN, one or more existing MD pages used to map logical addresses of the source LUN to corresponding content can be modified. However, prior to modifying the existing MD pages of the source LUN, a MD page split operation can be performed to preserve or duplicate the existing MD page content in a new MD page for use with the snapshot. Thus, a tuple of MD update type T3 can be used to denote the MD page split operation processing with respect to an existing MD page. The MD page split can include allocating a new MD page where the content of the existing MD page is copied to the new MD page. From the step 212, control proceeds to the step 214.

At the step 214, a reply is sent from the peer node the initiator node. The reply is sent in response to the commit message of prior steps 204 and 206. From the step 214, control proceeds to the step 216.

At the step 216, the initiator node receives the reply from the peer node. From the step 216, control proceeds to the step 218.

At the step 218, the initiator node can store one or more entries or tuples in its in-memory metadata log (e.g., volatile memory copy) for the one or more MD page updates (as sent in the commit message to the peer node in the step 204). One or more updated MD pages are constructed reflecting application of the one or more MD updates to the one or more MD pages of the transaction. The resulting one or more updated MD pages are stored in the initiator node's cache. Generally, the initiator node can apply the one or more MD updates of the transaction to its cached copy (e.g., volatile memory cached copy) of each of the one or more MD pages of the transaction, and store the resulting updated version of each of the one or more MD pages in its cache. From the step 218, control proceeds to the step 220.

At the step 220, the initiator node can release the MD page locks of the first set and the second set, where such locks are those acquired in the step 202 and are associated with the respective one or more MD pages updated in the commit processing of the transaction.

The techniques described in the following paragraphs provide for reading one or more MD pages, or portions thereof. Consistent with other discussion herein, a node can receive an I/O operation, such as a read I/O operation, that reads user data from a target logical address, such as from a LUN and an LBA or offset on the LUN. In connection with processing or servicing the read I/O operation, the node can read metadata from one or more MD pages to obtain the requested read data. The one or more MD pages can be used, for example, to map the target logical address to the corresponding physical storage location of the requested read data. The node can receive an I/O operation, such as a write I/O operation, that writes user data to the target logical address. In connection with processing or servicing the write I/O operation, the node may also need to read metadata from one or more MD pages.

Figure 9:
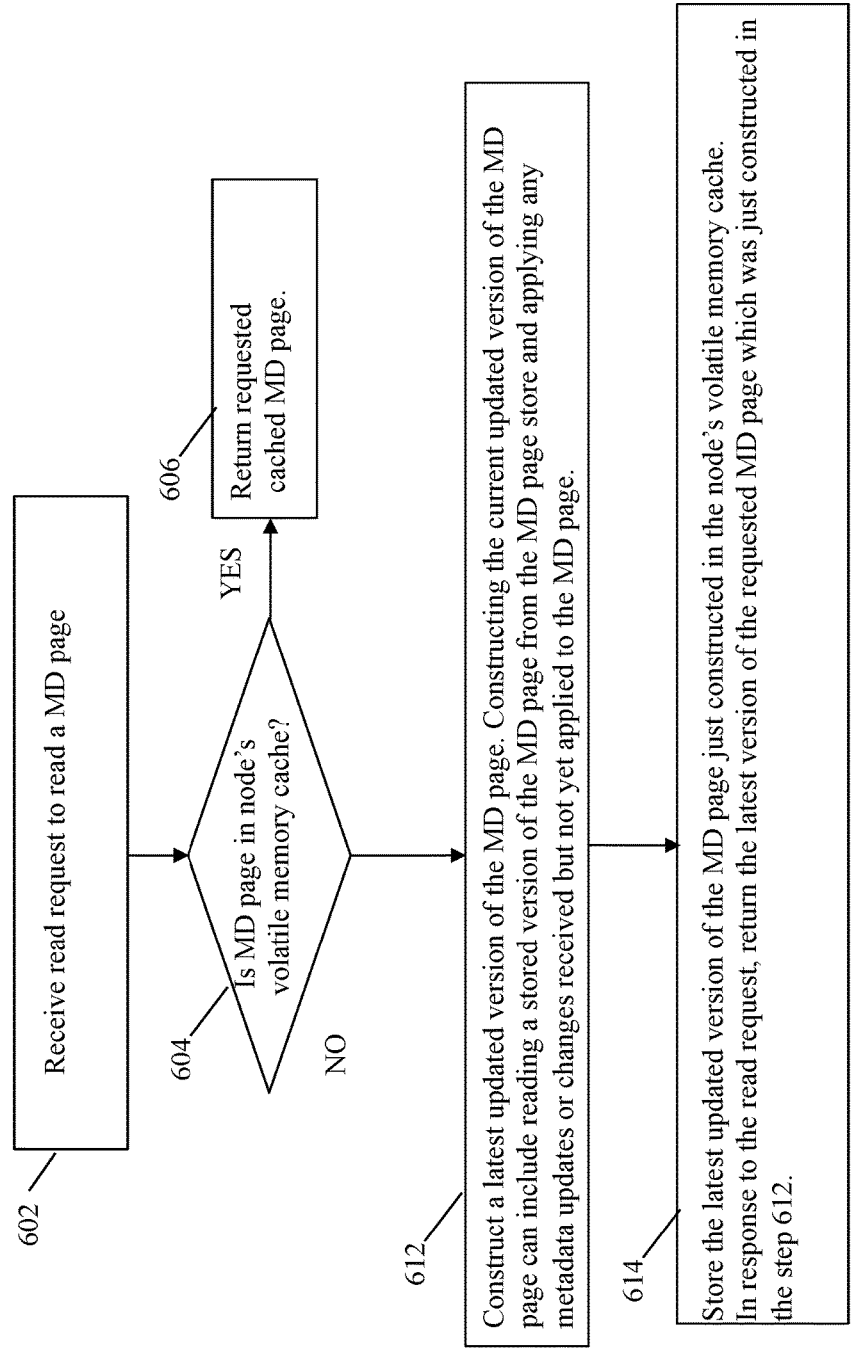

Referring to FIG. 9, shown is a flowchart 600 of processing steps that can be used in connection with servicing a read request to read metadata from a MD page.

At the step, 602 a node may receive a read request for a MD page. From the step 602, control proceeds to the step 604.

At the step 604, a determination is made as to whether the MD page is currently stored in the node's volatile memory cache. If the step 604 evaluates to yes, a read cache hit is determined with respect to the requested MD page. If the step 604 evaluates to no, a read cache miss is determined with respect to the MD page and read cache miss processing can be performed. If the step 604 evaluates to yes, control proceeds to the step 606.

At the step 606, processing is performed to return a response to the read request received in the step 602. Processing of the step 606 can include retrieving the requested MD page from the node's local volatile memory cache MD, and returning the requested MD page in response to the read request.

If the step 604 evaluates to no, control proceeds to the step 612. At the step 612, processing can be performed to construct the latest version of the requested MD page. Constructing the current version of the requested MD page C1, where C1 can denote the LI of the current MD page, can include reading a stored version of the MD page from the MD page store of the BE PDs, and applying any metadata updates or changes received but not yet applied to the MD page. The metadata updates for the MD page can be aggregated from the in-memory or volatile memory structures of the node's volatile memory 501 (e.g., the in-memory metadata log from the bucket sets 502, 504 of the volatile memory 501 of the nodes) and also from the BE PDs 542. In particular, the metadata updates for the MD page can be aggregated and merged from the bucket sets 502 and 504 (e.g., the node's in-memory metadata log), and also from the destaged bucket sets 524. The metadata updates for the particular MD page can be retrieved based on the LI uniquely associated with the MD page, where the LI is mapped uniquely to a particular bucket in each of the bucket sets 502, 504, and each of the bucket sets of 524. Consistent with other discussion herein, the metadata updates for the MD page can be aggregated and merged. A stored version of the MD page can be retrieved from the MD page store 540, and the merged metadata updates from the MD page can then be applied to the stored version of the MD page to thereby obtain the latest version of the MD page. The metadata updates for the particular MD page C1 can be retrieved based on the LI=C1 uniquely associated with the MD page C1, where the LI is mapped uniquely to a particular bucket in each of the bucket sets 502, 504, and each of the bucket sets of 524. Consistent with other discussion herein, the metadata updates for the MD page C1 can be aggregated and merged. A stored version of the MD page C1 can be retrieved from the MD page store 540, and the merged metadata updates from the MD page C1 can then be applied to the stored version of the MD page to thereby obtain the latest version of the MD page C1. From the step 612, control proceeds to the step 614.

At the step 614, the latest version of the MD page C1 just constructed can be stored in the node's volatile memory cache. In response to the read request, the latest version of the MD page just constructed and stored in the node's volatile memory cache can be returned.

As discussed above, the full MD page construction (e.g., step 612, cache miss processing) to obtain a latest version of the requested MD page can occur when the requested MD page is not located in the node's cache.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
   determining, by a first node, a first update to a first metadata (MD) page, wherein the first node includes a first cache;
   sending, from the first node to a second node, a commit message including the first update to the first MD page;
   receiving, at the second node, the commit message from the first node; and
   storing, by the second node, an updated version of the first MD page in a second cache of the second node only if the second cache of the second node includes an existing cached copy of the first MD page, wherein the updated version of the first MD page, as stored in the second cache of the second node, is constructed by applying the first update to the existing cached copy of the first MD page, wherein the first node is an initiator node of a transaction including one or more updates to one or more MD pages, wherein the one or more updates includes the first update, and wherein the one or more MD pages includes the first MD page, wherein the commit message includes the one or more updates, wherein a subset of one or more update types identify types of MD updates which are not performed on a non-initiator node, and wherein the one or more updates includes a second update to a second MD page, wherein the second update has a corresponding MD update type included in the subset, wherein the second node is the non-initiator node of the transaction, and the method further comprises:
   determining, by the second node, that the second cache of the second node includes a copy of the second MD page and that the second update to the second MD page has a corresponding MD update type included in the subset; and
   responsive to determining that the second cache of the second node includes the copy of the second MD page and that the second update to the second MD page has the corresponding MD update type included in the subset, invalidating or evicting the copy of the second MD page from the second cache of the second node.

2. The computer-implemented method of claim 1, further comprising:
   determining, by the second node, whether the second cache of the second node includes the existing cached copy of the first MD page; and
   if the second cache of the second node does not include the existing cached copy of the first MD page, not storing the updated version of the first MD page in the second cache of the second node.

3. The computer-implemented method of claim 1, further comprising:
   responsive to the second node receiving the commit message from the first node, the second node persistently storing the first update to the first MD page in a persisted MD log on non-volatile storage.

4. The computer-implemented method of claim 3, further comprising:
   responsive to the second node receiving the commit message from the first node, the second node storing the first update to the first MD page in an in-memory MD log.

5. The computer-implemented method of claim 4, wherein the in-memory MD log is local to the second node and used only by the second node.

6. The computer-implemented method of claim 1, wherein said storing is performed responsive to the second node receiving the commit message from the first node.

7. The computer-implemented method of claim 1, further comprising:
   sending a reply to the commit message from the second node to the first node.

8. The computer-implemented method of claim 7, further comprising:
   responsive to the first node receiving the reply from the second node, the first node storing the first update to the first MD page in an in-memory MD log.

9. The computer-implemented method of claim 8, wherein the in-memory MD log is local to the first node and used only by the first node.

10. The computer-implemented method of claim 8, further comprising:
    responsive to the first node receiving the reply from the second node, the first node storing the updated version of the first MD page in the first cache of the first node, wherein the updated version of the first MD page, as stored in the first cache of the first node, is constructed by applying the first update to another existing copy of the first MD page stored in the first cache of the first node.

11. The computer-implemented method of claim 1, wherein each of the one or more updates is specified using a tuple identifying content of one of the one or more MD pages which is modified by said each update.

12. The computer-implemented method of claim 1, wherein the first node, as the initiator node, receives a write I/O operation from a host, and wherein the one or more updates to the one or more MD pages is performed as part of processing to service the write I/O operation.

13. The computer-implemented method of claim 12, wherein the write I/O operation writes first content to a target logical address of a logical volume, and wherein the one or more MD pages are included in a sequence of MD pages mapping the target logical address of the logical volume to a storage location of the first content stored at the target logical address.

14. The computer-implemented method of claim 1, wherein the subset of one or more update types includes one update type indicating a complex MD update type.

15. The computer-implemented method of claim 1, wherein the subset of one or more update types includes one update type denoting a dependent MD page update where one MD update to one MD page depends on content of another MD page such that the one MD update references the content of the another MD page.

16. The computer-implemented method of claim 15, wherein the one update type denotes a MD page split operation performing in connection with a snapshot of a base storage object where the snapshot and the base storage object both include identical content prior to applying any subsequent writes to the base storage object.

17. A system comprising:
one or more processors; and
one or more memories comprising code stored thereon that, when executed, performs a method of comprising:
determining, by a first node, a first update to a first metadata (MD) page, wherein the first node includes a first cache;
sending, from the first node to a second node, a commit message including the first update to the first MD page;
receiving, at the second node, the commit message from the first node; and
storing, by the second node, an updated version of the first MD page in a second cache of the second node only if the second cache of the second node includes an existing cached copy of the first MD page, wherein the updated version of the first MD page, as stored in the second cache of the second node, is constructed by applying the first update to the existing cached copy of the first MD page, wherein the first node is an initiator node of a transaction including one or more updates to one or more MD pages, wherein the one or more updates includes the first update, and wherein the one or more MD pages includes the first MD page, wherein the commit message includes the one or more updates, wherein a subset of one or more update types identify types of MD updates which are not performed on a non-initiator node, and wherein the one or more updates includes a second update to a second MD page, wherein the second update has a corresponding MD update type included in the subset, wherein the second node is the non-initiator node of the transaction, and the method further comprises:
determining, by the second node, that the second cache of the second node includes a copy of the second MD page and that the second update to the second MD page has a corresponding MD update type included in the subset; and
responsive to determining that the second cache of the second node includes the copy of the second MD page and that the second update to the second MD page has the corresponding MD update type included in the subset, invalidating or evicting the copy of the second MD page from the second cache of the second node.

18. A non-transitory computer readable medium comprising code stored thereon that, when executed, performs a method comprising:
determining, by a first node, a first update to a first metadata (MD) page, wherein the first node includes a first cache;
sending, from the first node to a second node, a commit message including the first update to the first MD page;
receiving, at the second node, the commit message from the first node; and
storing, by the second node, an updated version of the first MD page in a second cache of the second node only if the second cache of the second node includes an existing cached copy of the first MD page, wherein the updated version of the first MD page, as stored in the second cache of the second node, is constructed by applying the first update to the existing cached copy of the first MD page, wherein the first node is an initiator node of a transaction including one or more updates to one or more MD pages, wherein the one or more updates includes the first update, and wherein the one or more MD pages includes the first MD page, wherein the commit message includes the one or more updates, wherein a subset of one or more update types identify types of MD updates which are not performed on a non-initiator node, and wherein the one or more updates includes a second update to a second MD page, wherein the second update has a corresponding MD update type included in the subset, wherein the second node is the non-initiator node of the transaction, and the method further comprises:
determining, by the second node, that the second cache of the second node includes a copy of the second MD page and that the second update to the second MD page has a corresponding MD update type included in the subset; and
responsive to determining that the second cache of the second node includes the copy of the second MD page and that the second update to the second MD page has the corresponding MD update type included in the subset, invalidating or evicting the copy of the second MD page from the second cache of the second node.

* * * * *

UNITED STATES PATENT AND TRADEMARK OFFICE
CERTIFICATE OF CORRECTION

PATENT NO. : 12,141,065 B2  
APPLICATION NO. : 18/116004  
DATED : November 12, 2024  
INVENTOR(S) : Sabo et al.

Page 1 of 1

It is certified that error appears in the above-identified patent and that said Letters Patent is hereby corrected as shown below:

On the Title Page

Item (57) ABSTRACT:
The abstract "In at least one embodiment, processing can include determining, by a first node, an update to a metadata (MD) page, wherein the first node includes a first cache; sending, from the first node to a second node, a commit message including the update to the MID page; receiving, at the second node, the commit message from the first node; and storing, by the second node, an updated version of the MID page in a second cache of the second node only if the second cache of the second node includes a cached copy of the MD page, wherein the updated version of the MID page, as stored in the second cache of the second node, is constructed by applying the first update to the cached copy of the first MD page."

Should read:
-- In at least one embodiment, processing can include determining, by a first node, an update to a metadata (MD) page, wherein the first node includes a first cache; sending, from the first node to a second node, a commit message including the update to the MD page; receiving, at the second node, the commit message from the first node; and storing, by the second node, an updated version of the MD page in a second cache of the second node only if the second cache of the second node includes a cached copy of the MD page, wherein the updated version of the MD page, as stored in the second cache of the second node, is constructed by applying the first update to the cached copy of the first MD page. --

Signed and Sealed this  
Thirty-first Day of December, 2024

Derrick Brent  
*Acting Director of the United States Patent and Trademark Office*